United States Patent [19]

Harter, deceased et al.

[11] 3,966,119

[45] June 29, 1976

[54] VALVE ASSEMBLY WITH PLURAL FLOW PATH CONTROL

[75] Inventors: Robert M. Harter, deceased, late of Gowanda, N.Y., by Patricia Harter, executrix; Gary L. Russo, Gowanda, N.Y.

[73] Assignee: AVM Corporation, Jamestown, N.Y.

[22] Filed: Oct. 11, 1974

[21] Appl. No.: 514,183

Related U.S. Application Data

[63] Continuation of Ser. No. 286,663, Sept. 6, 1972, abandoned.

[52] U.S. Cl. ............................ 237/12.3 B; 137/612.1; 251/209; 251/174; 137/625.47; 165/38
[51] Int. Cl.[2] .................... F16K 11/18; B60H 1/02; G05D 15/00
[58] Field of Search .................... 137/612.1, 625.47; 251/174, 209, 310; 165/38; 237/12.3 B

[56] References Cited
UNITED STATES PATENTS

| | | |
|---|---|---|
| 2,140,292 | 12/1938 | Jensen ............................ 251/209 |
| 2,701,118 | 2/1955 | Uhler ............................ 137/612.1 X |
| 3,058,718 | 10/1962 | Johnson ........................... 251/310 X |
| 3,712,585 | 1/1973 | Grenier ............................ 251/174 |
| 3,742,983 | 7/1973 | Harter ............................ 137/625.47 |

FOREIGN PATENTS OR APPLICATIONS

| 5,502 | 12/1880 | United Kingdom ............ 251/DIG. 3 |
|---|---|---|

Primary Examiner—Henry T. Klinksiek
Attorney, Agent, or Firm—Strauch, Nolan, Neale, Nies & Kurz

[57] ABSTRACT

A pressure compensating, two-stage bypass metering valve assembly including a valve body having side inlet and outlet ports and a bottom bypass port, and a hollow plug rotatable in the body and having inlet and outlet metering orifices and an end opening aligning with the bypass port. A pressure responsive variable orifice bypass valve unit is mounted adjacent the bypass port and cooperates with the metering orifices to prevent any significant increase in fluid flow from the valve outlet even though fluid inlet pressure may fluctuate widely.

40 Claims, 11 Drawing Figures

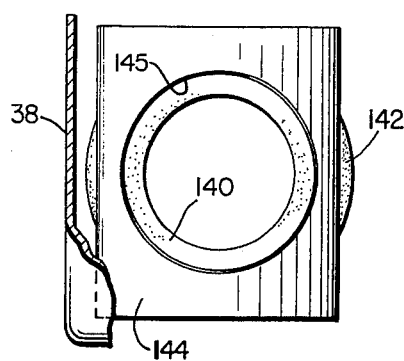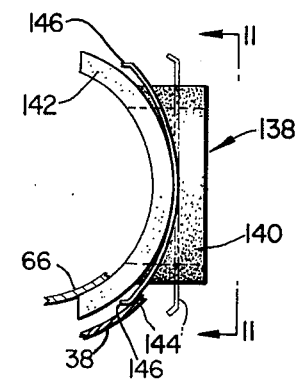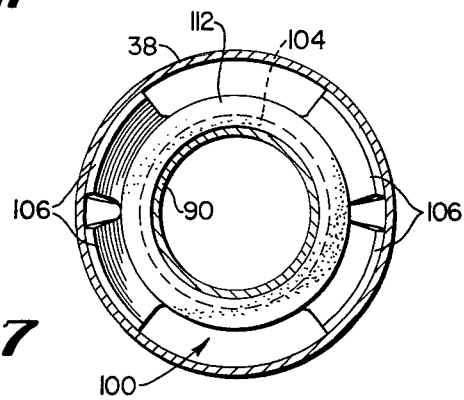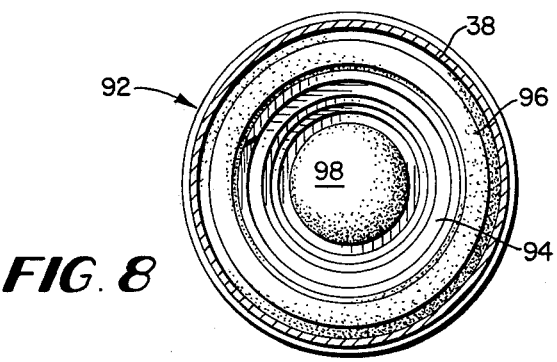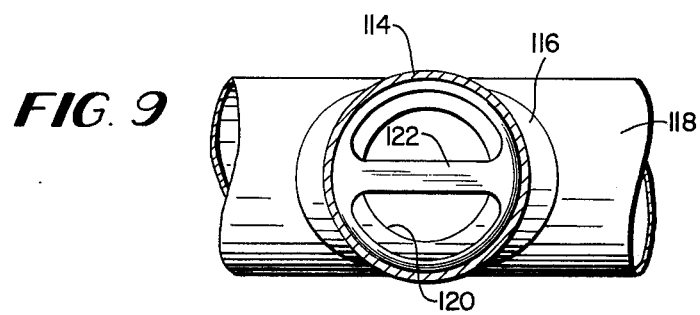

VALVE ASSEMBLY WITH PLURAL FLOW PATH CONTROL

CROSS-REFERENCE TO RELATED APPLICATIONS

This application is a continuation of co-pending application Ser. No. 286,663 filed Sept. 6, 1972 for VALVE (now abandoned).

BACKGROUND AND SUMMARY OF THE INVENTION

This invention relates generally to valves and more particularly to a novel, two-stage bypass metering valve which is especially useful in an automobile air conditioning system, although it may be used in other fluid control applications.

In a conventional air heater system in an automobile having a water cooled engine, hot water from the engine block is circulated by way of a control valve through a heater coil, and air to be heated is passed over the coil before it is introduced into the passenger compartment. The air heater controls are usually adjustable to enable the temperature of the air to be selectively varied within a wide temperature range. During operation of the automobile, for a selected temperature setting of the air heater controls, it is desirable that the temperature of air introduced into the passenger compartment remain substantially constant even though the speed of the automobile and the pressure of the cooling water may vary widely. In the past, this desirable operating condition has been difficult to obtain and maintain, particularly at the lower air temperature settings on the heater controls. Rather elaborate and complex valve assemblies have been developed and used in attempting to satisfy this requirement, but their performance and high cost have proved to be unacceptable.

Accordingly, the primary object of this invention resides in the provision of a novel pressure compensating valve assembly capable of accurately metering the flow of fluid from the valve outlet even though the pressure of the fluid at the inlet of the valve assembly may vary widely.

Another object of the invention resides in the provision of a novel, economical, two-stage bypass metering valve assembly which compensates for fluid inlet pressure variations to prevent the fluid flow from the valve outlet from changing by any significant amount at a selected set position of the valve assembly.

Still another object of the invention resides in the provision of a novel, inexpensive, two-stage bypass metering valve assembly especially useful in an automobile air conditioning system and capable of accurately metering the flow of heating fluid to the air heater apparatus so as to maintain the temperature of the heated air introduced into the passenger compartment at a relatively constant value even though the speed of the automobile and/or pressure of the inlet water to the valve assembly may vary widely.

A further object of the invention resides in the provision of a novel, pressure compensating, two-stage bypass metering valve assembly as discussed above capable of accurately metering the flow of fluid from the valve outlet even though the fluid pressure at the valve inlet fluctuates widely. The valve assembly includes a hollow plug having a coarse metering inlet orifice and a fine metering outlet orifice, and a variable orifice bypass unit which acts in response to increased inlet pressure to bypass a greater portion of the inlet fluid from the plug, thereby preventing the fluid flow through the outlet orifice from increasing by any significant amount.

These and other objects and advantages of the invention are attained by a novel, pressure compensating, two-stage metering valve assembly comprising a valve body provided with side inlet and outlet openings and a bottom axial bypass opening, a hollow plug member rotatable in the body and having side inlet and outlet metering orifices and an axial end opening aligning with the body bypass opening, and a variable orifice bypass valve unit mounted in the body for controlling the flow of fluid through the bypass opening. A resilient sealing ring is mounted at the outlet opening of the body and is spring biased against the plug to prevent leakage and thereby enable the outlet metering orifice to accurately control the fluid flow from the valve outlet. A retainer unit is mounted within the valve body and serves the dual purpose of providing bearing support to the lower end of the rotatable plug and for retaining the variable orifice valve unit in place within the bypass opening. The variable orifice valve unit is of novel construction and includes a spiral wound spring mounted in the bypass opening by a resilient grommet, with the spring opening and closing in response to the pressure within the body and plug. Consequently, the bypass valve unit cooperates with the outlet metering orifice to maintain the fluid flow from the valve outlet relatively constant even though the fluid pressure at the inlet of the valve fluctuates widely. In an automobile air conditioning system, the novel valve assembly performs this pressure compensating function primarily at the lower fluid flow positions or settings of the plug corresponding to the lower air temperature settings on the air heater controls.

BRIEF DESCRIPTION OF THE DRAWINGS

FIG. 7 is a fragmentary section view taken along line 7—7 of FIG. 3;

FIG. 8 is an enlarged fragmentary plan view taken generally along line 8—8 of FIG. 3 and illustrating the variable orifice bypass valve unit;

FIG. 9 is a fragmentary sectional plan view taken along line 9—9 of FIG. 3 and illustrating the bypass valve stop member;

FIG. 10 is an enlarged fragmentary view of the resilient seal unit at the outlet of the valve assembly taken generally along line 10—10 of FIG. 3; and FIG. 11 is an end view of the outlet seal unit taken generally along line 11—11 of FIG. 10.

DESCRIPTION OF PREFERRED EMBODIMENT

Figure 1:
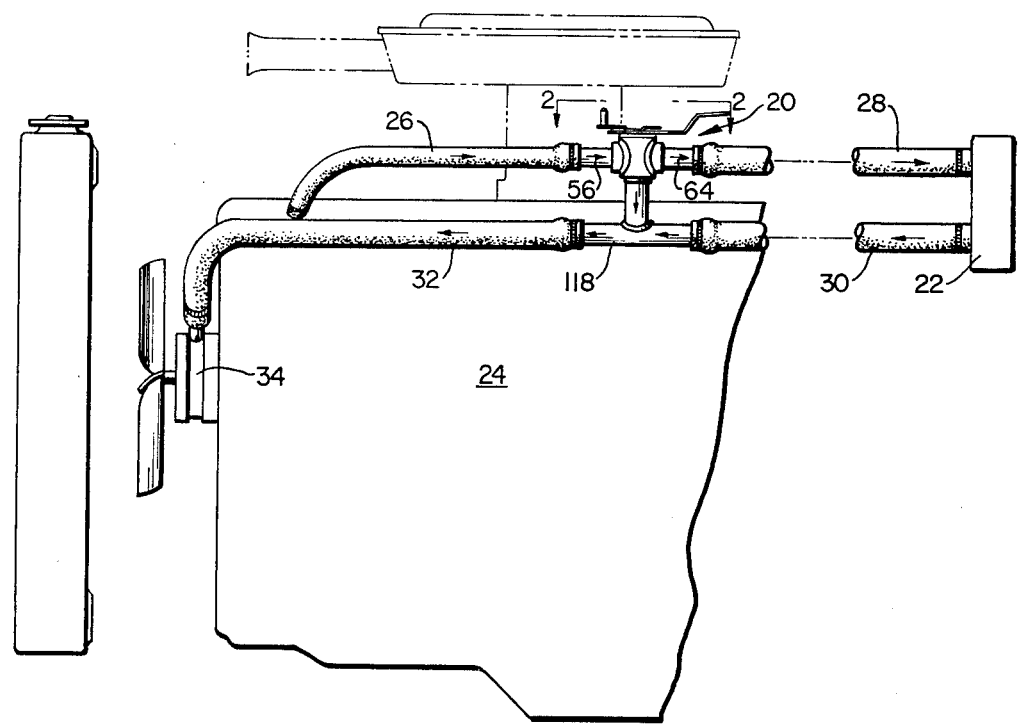
FIG. 1 is a schematic illustration of an automobile heater system in which the novel valve assembly of the invention may be advantageously employed.

The novel, two-stage, metering bypass valve assembly 20, illustrated in detail in FIGS. 2—12, has been found especially useful in an automobile heater system shown schematically in FIG. 1. Typically, the heater system includes a hot water heater coil 22 to which hot water from engine block 24 is delivered by way of flexible conduit 26, valve assembly 20 and flexible coil inlet conduit 28. The exhaust fluid from coil 22 is returned by flexible conduit 30, valve assembly 20 and flexible conduit 32 to the suction side of a conventional water pump 34 provided in the engine cooling system. Air to be heated is passed over the heater coil 22 and then delivered into the passenger compartment. As discussed hereinabove, for a particular temperature setting of the air heater controls which govern the fluid flow position of valve assembly 20, it is desirable that the temperture of the air delivered into the passenger compartment remain substantially constant regardless of the speed of the automobile and/or pressure of the hot water delivered to conduit 26, and the novel valve assembly 20 attains this objective.

Figure 2:
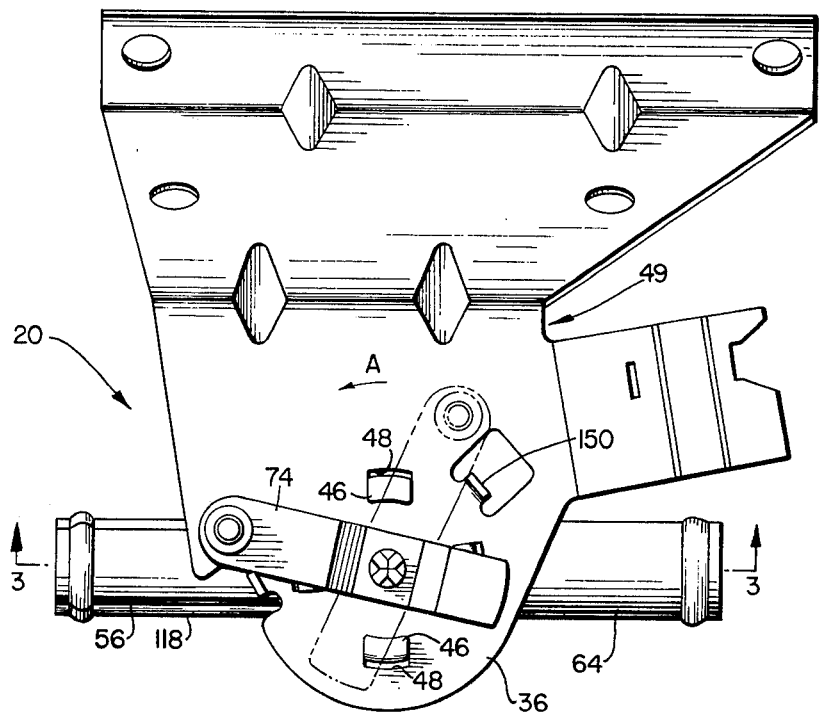
FIG. 2 is a fragmentary plan view of the novel valve assembly of the invention taken generally along line 2—2 of FIG. 1 and illustrating the valve operating lever as it is positioned to fully open the valve.
Figure 3:
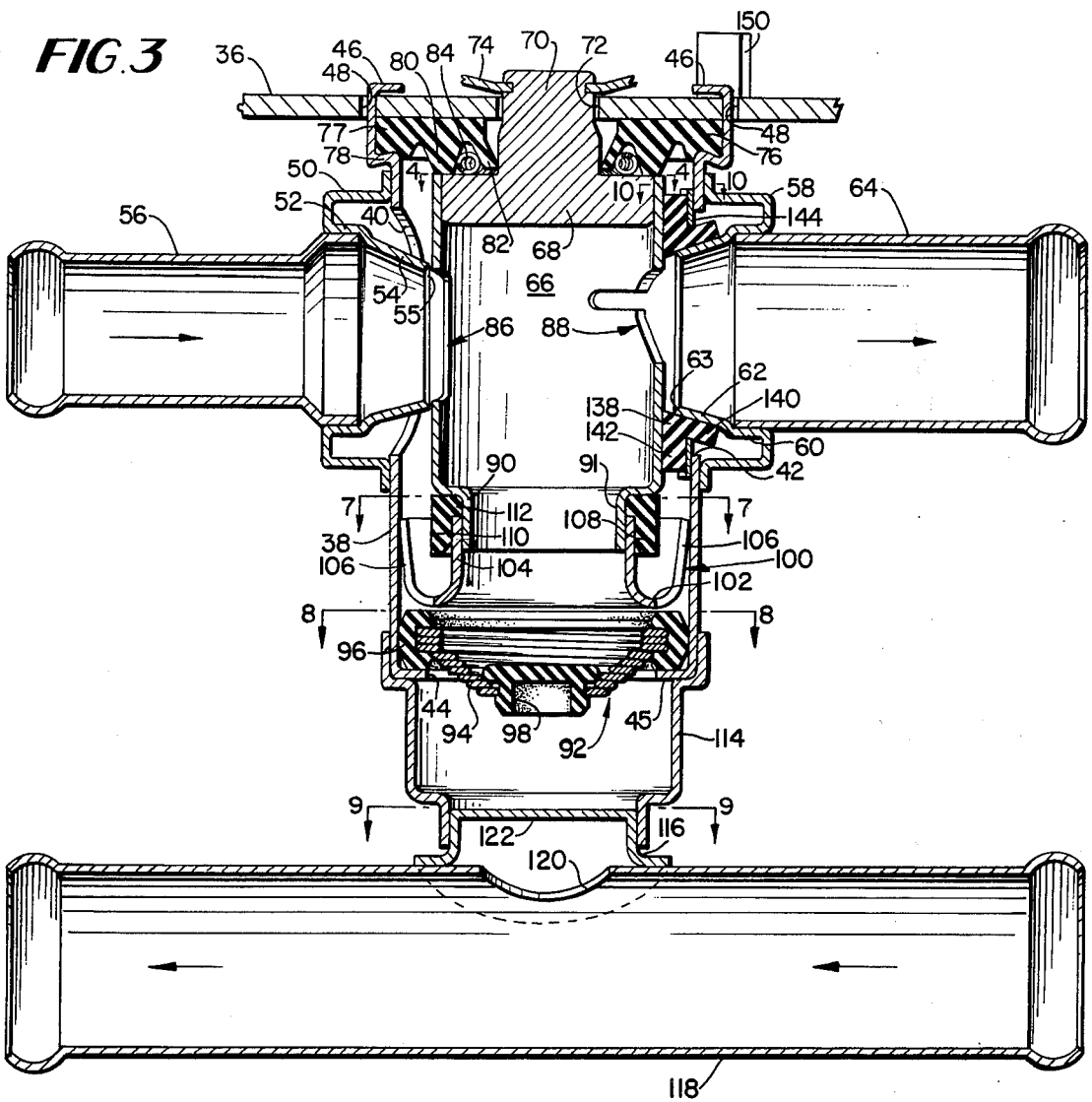
FIG. 3 is an enlarged fragmentary sectional elevation view of the valve assembly taken generally along line 3—3 of FIG. 2.
Figure 5:
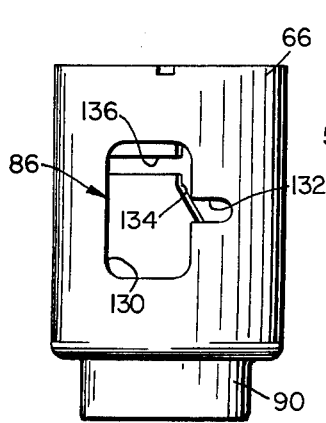
FIG. 5 is a side elevation view taken generally along line 5—5 of FIG. 4 and illustrating in particular the inlet metering orifice on the plug.

Referring to FIGS. 2 and 3, valve assembly 20 appears in FIG. 3 at about twice its actual size, although it is not illustrated to exact scale. The assembly comprises a top plate 36 which serves as a cover for the open top of a hollow, cylindrical metal valve body 38 having diametrically opposed inlet and outlet openings 40 and 42, respectively, and a bottom axial bypass opening 44 defined by an inwardly turned annular flange 45. Body 38 is suspended from plate 36 by tabs 46 which extend through plate apertures 48 and are bent over onto the upper side of the plate, which also serves as part of a mounting bracket 49 for mounting the valve assembly in a desired location.

An integral metal inlet tube mounting saddle 50 is fixed, as by brazing, to body 38 in surrounding relationship with inlet opening 40 and includes an inner portion 52 formed at its inner end with a reduced diameter, inwardly converging, tapered section 54 which projects within body opening 40 and has an inlet port 55. A fluid inlet tube 56 is press fitted within saddle portion 52 and secured therein by brazing, with tube 56 being connected to conduit 26 in the system of FIG. 1.

An integral metal outlet tube mounting saddle 58 is also fixed to body 38 in surrounding relation with outlet opening 42 and includes an inner portion 60 formed at its inner end with an inwardly converging section 62 which projects within body outlet opening 42 and has an outlet port 63. A fluid outlet tube 64 is press fitted within saddle portion 60 and secured therein by brazing, with tube 64 connected to conduit 28 in FIG. 1.

A hollow cylindrical sheet metal valve plug 66 is rotatably mounted within body 38 and has a metal closure 68 press fitted within its upper open end, with an integral valve stem 70 projecting from closure 68 through aperture 72 in plate 36. A valve operating lever 74 has a serrated (not shown) opening which fits over the upper end of stem 70 to positively, frictionally secure the lever thereon. The end of stem 70 can be swaged over to secure the lever on the stem in a conventional manner, as shown in FIGS. 2 and 3.

A resilient annular stem seal 76 includes an outer annular section 77 compressed between the underside of plate 36 and an upper body shoulder 78, an intermediate annular section 80 compressed between plate 36 and the upper flat surface of valve plug 66 and closure 68, and an inner section 82 which is contracted by spring ring 84 to sealingly surround valve stem 70.

Valve plug 66 (FIGS. 3–6) has a coarse metering, inlet orifice 86 adapted to align with body inlet port 55, a fine metering, outlet orifice 88 which aligns with body outlet port 63 and a reduced diameter open bottom section 90 having an axial end opening 91. Bottom section 90 communicates with and is spaced above bypass opening 44 in body 38.

A variable orifice bypass valve unit 92 (FIGS. 3 and 8) controls the flow of fluid bypassed from the interior of hollow plug 66 through opening 44. Valve unit 92 is illustrated in copending application Ser. No. 288,934 (now U.S. Patent No. 3,868,991) of William L. Sheppard entitled VALVE ASSEMBLY, which patent is owned by the assignee of the present application. The unit includes a helical generally frusto-conical shaped spring 94 wound to assume a normally closed position shown in FIG. 3 and axially expansible in response to inlet fluid pressure to bypass fluid between spaced adjacent turns of the expanded spring. The larger upper end of spring 94 is secured in a resilient rubber grommet 96, and a plastic plug 98 is fixed in and blocks the central axial opening in the smaller, lower end of the spring. Unit 92 is normally retained in place in valve body 38 by grommet 96 which frictionally engages against the body and seats on flange 45 to properly locate spring 94 in bypass opening 44.

A retainer assembly 100 (FIGS. 3 and 7) is mounted within body 38 and includes a stainless steel retainer member 102 having an inner cylindrical section 104 and a plurality of stiff outer ribs 106 which are formed integrally with the lower end of section 104. Ribs 106 frictionally engage the internal wall of body 38 and, during initial assemblage of the valve assembly, locate and fix member 102 in the body slightly above valve unit 92 and otu of contact with the top of grommet 96 so that the spring characteristics of unit 92 are not affected.

Bottom section 90 of plug 66 rotatably fits within the upper end of retainer section 104, and the retainer thereby provides stabilizing bearing support for the bottom of the plug. An annular resilient seal ring 108 has an axial portion 110 engaging around the outer surface of retainer section 104 and a radial portion 112 which extends over the upper end of section 104 into bearing engagement with and around plug section 90. Ring 108 assists in keeping solid particles away from the bearing surface between the plug and the upper end of the retainer bearing section 104.

A metal tube section 114 has its upper end conforming and fixed to the lower end of body 38 and its lower reduced diameter end fixed to a saddle member 116 (FIGS. 3 and 9) which conforms to and is brazed on a metal fluid return tube 118 about an opening 120. Saddle 116 has an integral transverse rib 122 extending across the flow path of the fluid bypassed through spring 94. Rib 122 acts as a stop for plug 98 to establish the maximum valve open position for spring 94. It also prevents the spring valve unit 92 from being dislodged into conduit 118 under abnormal operating conditions in the fluid system. In the system of FIG. 1, tube 118 is connected between conduits 30 and 32 and returns the exhaust fluid from heater coil 22 and the bypass fluid through unit 92 back to pump 34.

Figure 4:
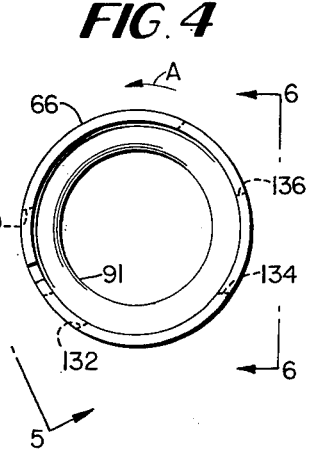
FIG. 4 is a fragmentary plan view of the valve plug taken generally along line 4—4 of FIG. 3 with the valve stem removed.
Figure 6:
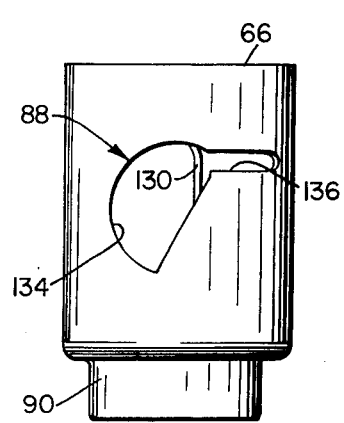
FIG. 6 is a side elevation view taken generally along line 6—6 of FIG. 4 and illustrating in particular the outlet metering orifice on the plug.

Returning to the description of plug 66, the coarse metering inlet orifice 86 (FIG. 5) includes an enlarged, generally rectangular opening portion 130 and a narrow slot portion 132 which extends circumferentially from approximately the midpoint of portion 130 a short distance around plug 66 in the valve opening direction of arrow A in FIGS. 2 and 4. Slot portion 132 promotes smooth fluid flow through the valve assembly as it is initially opened from a closed position.

The fine metering outlet orifice 88 includes an irregular shaped opening portion 134 and a narrow slot portion 136 extending circumferentially from the upper edge of portion 134 in the valve opening direction of arrow A a distance corresponding to about one-half the angular displacement of plug 66 from a closed to a fully open position. Opening portion 134 is shaped to provide a controlled, smooth, gradual increase in outlet fluid flow as it aligns with outlet port 63 during turning of plug 66.

At the outlet side of plug 66, a resilient seal ring 138 is mounted on tapered section 62 of saddle 58. As shown in FIGS. 3, 10 and 11, ring 138 is generally L-shaped in normal radial section with one resiliently stressed arm 140 snugly and resiliently surrounding the smooth outer surface of tapered section 62 around outlet port 63. The other resiliently stressed arm 142 of ring 138 engages with and conforms snugly to the contour of plug 66.

A resilient, stainless steel, spring plate element 144 has an opening 145 by which it is slipped over the end of ring arm 140 to engage between body 38 and the backside of ring arm 142. In a relaxed condition, spring plate 144 is substantially flat as shown in phantom in FIG. 10 and has side edges 146 curved inwardly toward ring arm 142. When in place, spring 144 is deformed to the full line position of FIG. 10 to bias ring 138 into snug engagement with plug 66 and thereby ensure a fluid tight seal between the exerior surface of the plug and the outlet 63 of the valve. The outer surfaces of curved edges 146 provide smooth bearing contact with valve body 38.

Metering orifices 86 and 88 are designed and circumferentially located on plug 66 so that operating lever 74 and plug 66 will be turned through an angular distance of approximately 100° to move the plug from a fully closed to a fully open position. In the closed position of the valve, operating lever 74 abuts against a stop projection 150 (FIGS. 2 and 3) on plate 36 and seal ring 138 is in flush sealing engagement with plug 66 with no part of the outlet metering orifice 88 aligning with outlet port 63. For optimum efficiency of the valve, the circumferential spacign between orifices 86 and 88 is such that in the closed position of plug 66, part of the slot portion 132 of inlet orifice 86 will be aligned with the inlet port 55, and consequently it is not feasible to seal completely around inlet port 55. Because there is no seal at this point, there will be a constant flow of fluid from inlet tube 56 through orifice 86 into as well as around the outside of the plug 66 and out through the bypass orifice defined by spring 94 which expands or contracts in response to inlet fluid pressure and fluid pressure in the plug. The bypassed fluid will drain through opening 120 into return conduit 118. However, the amount of fluid entering the plug in the valve closed position is somewhat restricted by the close proximity of the circumferential surface of the plug to the inlet edge of tapered section 54 defining port 55. Thus, the amount of fluid bypassed does not become objectionable.

Operation of valve assembly 20 will now be described as it is used specifically in the heating system shown in FIG. 1. Operating lever 74 will be operated by a conventional bowden cable which connects lever 74 to a manual adjustable control lever on the heater controls located within the passenger compartment of the vehicle. With lever 74 abutting against stop 150, plug 66 is in a valve closed position and no fluid is passed through outlet port 63 to outlet tube 64, consequently no heat is supplied to the passenger compartment. In this valve closed position some fluid will flow from block 24 and conduit 26 to the inlet tube 56 into the plug chamber and will be bypassed through the variable bypass opening defined by spring 94 as it expands downwardly in response to the pressure of the fluid. The bypassed fluid drains through opening 120 into return conduit 118 and is passed back to the inlet suction side of pump 34. As discussed hereinabove, in the valve closed position, the amount of fluid diverted from the main cooling system for block 24 through conduit 26 and constantly bypassed through valve unit 92 in valve assembly 20 is restricted and falls within acceptable limits. The actual amount of fluid circulated will depend upon the fluid pressure and the amount of expansion of spring 94 caused by the fluid pressure.

Assume now that operating lever 74 is adjusted counterclockwise in the direction of arrow A of FIG. 2 through ¼ of its maximum travel distance or approximately 25°, which corresponds to a low temperature setting on the heater controls within the passenger compartment. Plug 66 is thus rotated in a valve opening direction to bring a portion of inlet metering orifice 86 into direct alignment with inlet port 55 and to also bring about half the circumferential width of slot portion 136 of outlet metering orifice 88 into fluid communication with outlet port 63. During initial opening of the valve, slot portion 132 of orifice 86 provides a smooth gradual increase in flow through inlet port 55 and prevents hammering or chattering in the valve. A portion of the fluid passed into the plug through orifice 86 passes through the outlet slot portion 136 to outlet tube 64, conduit 28, heater coil 22 and conduit 30 back to the return conduit 118. The remaining portion of fluid introduced into the plug is bypassed through spring 94 which expands downwardly in response to the fluid pressure within the plug and is then drained through opening 120 into conduit 118 where it is combined with the return fluid from heater coil 22 and is passed therewith through conduit 32 into the suction side of pump 34.

During operation of the vehicle the pressure of the water fed to inlet tube 56 and into plug 66 may vary substantially, for example, between 1.0 psig and 8.0 psig as the speed of the vehicle varies, for example, between idle and 70 miles per hour (mph). Under such variable water pressure conditions in inlet tube 56, valve assembly 20 is effective in preventing any significant variations in fluid flow through outlet metering orifice 88 and outlet tube 64 to the heater coil 22, and thereby ensures that the air passing over heater coil 22 and into the passenger compartment will be maintained at a substantially constant temperature. This is so because the fluid in plug 66 acts against the variable orifice spring unit 92 and, as inlet fluid pressure increases, spring 94 is expanded to increase the effective bypass opening defined between adjacent turns of the spring, thereby increasing the amount of fluid bypassed through unit 92 and drained into return conduit 118 back into pump 34.

As the inlet fluid pressure increases with an increase in vehicle speed, the actual amount of fluid passes through metering orifice 88 to coil 22 may increase somewhat, but the increase will not significantly affect the temperature of the air. For example, valves constructed in accordance with the invention as described above have been found to satisfy the following requirements for a setting of lever 74 corresponding to ¼ of its total travel or approximately 25° angular displacement. As the speed of the vehicle increased from about idle to approximately 70 mph, the valve inlet water pressure in inlet tube 56 increased from about 1.0 psig to about 8.0 psig, or 800% increase in inlet water pressure, while the actual flow of water through outlet orifice 88 to the heater coil increased by only about 30 to 65% of outlet flow at idle speed. With operating lever 74 set at its ⅜ and ½ total travel positions for the same vehicle speed and inlet water pressure conditions, the total water flow through outlet metering orifice 88 increased only by a maximum of 70% and 85% idle flow, respectively. In each case however, the actual amount of increase in fluid flow through metering orifice 88 to the heater coil 22 (maximum 65, 70 and 85%) is relatively insignificant as compared to the 800% increase in inlet water pressure. This increase in outlet water flow through outlet tube 64 has been found to be acceptable, primarily due to the flow characteristics in the overall heater system. It has been found that, as the car speed increases the actual temperature of the air upstream of the heater coil decreases due to engine speed and ram air effects. Therefore, the relatively small increase in water flow through outlet tube 64 to heater coil 22 will essentially maintain the air passed over the heater coil and delivered into the passenger compartment at a relatively constant temperature.

As discussed hereinabove, the design of metering orifices 86 and 88 and particularly the irregular configuration of outlet orifice 88 provide a pressure compensating effect in the heater system, primarily at the lower air temperature settings of the heater controls corresponding to positions of operating lever 74 of up to one-half its maximum travel or about 50° angular displacement. Up to about the one-half travel setting of lever 74, only outlet slot portion 136 is in fluid communication with the outlet port 63, and this provides a very accurate, closely controlled flow of fluid from the interior of the plug to outlet tube 64 and heater coil 22. When the main air heater controls are adjusted to the high air temperature range to provide very hot air into the passenger compartment, for example, temperature settings corresponding to valve settings of operating lever 74 at one-half or greater total travel positions, plug 66 will be positioned toward a fully open position and outlet slot portion 134 will register with the outlet port 63. When this occurs, particularly at the maximum temperature, full open position of plug 66, little pressure compensating effect need be or is performed by the valve assembly and little or no fluid is bypassed through the valve unit 92.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve assembly comprising: body means having a fluid inlet and a fluid outlet and a bypass outlet; a hollow plug valve member rotatable in said body means and having a through passage provided including a hollow chamber with an end opening and with inlet and outlet openings adapted to align with said fluid inlet and fluid outlet, respectively, in a valve open position; and bypass orifice means in said body means providing fluid communication via the interior of said body means with said fluid inlet and with said plug member end opening to enable regulated discharge of fluid from said valve body through said bypass outlet.

2. A valve assembly as defined in claim 1, said bypass orifice means comprising a by-pass opening communicating with said end opening and valve means regulating the fluid flow through said outlet opening by controlling the flow of fluid through said by-pass opening.

3. A valve assembly as defined in claim 2, said valve means comprising a normally closed valve unit which opens in response to fluid pressure in said valve member to discharge fluid through said bypass opening.

4. A valve assembly as defined in claim 3, wherein said valve unit comprises a normally closed helical spring which is expansible to an open position in response to fluid pressure in said valve member.

5. A valve assembly as defined in claim 1, said valve member being a hollow cylindrical plug having an outlet opening shaped to provide an opening of decreasing area in the valve opening direction assuring a gradual increase in flow through said fluid outlet in said body means as said plug is rotated in a valve opening direction.

6. A valve assembly as defined in claim 5, wherein said outlet opening includes an enlarged flow portion and a narrow slot portion extending circumferentially around said plug from said enlarged flow portion in the valve opening whereby upon valve opening movement of said plug fluid at gradually increasing flow rates up to maximum flows through said outlet opening to said fluid outlet.

7. A valve assembly as defined in claim 5, comprising a resilient seal ring providing a seal between said plug and said fluid outlet, and spring means acting between said body means and said seal ring to urge said ring into tight sealing engagement with said plug.

8. A valve assembly as defined in claim 7, wherein said spring means is a deformable spring plate element which when mounted in place is deformed between said body means and said ring to resiliently bias said ring into sealing engagement with said plug.

9. A valve assembly as defined in claim 1, said valve member being a hollow cylindrical plug provided with said side inlet and outlet openings and a bottom end opening, and retainer means in said body means upstream of said bypass orifice means for providing bearing support for the bottom of said plug.

10. A valve assembly as defined in claim 9, said retainer means comprising an annular member separate from said body surrounding the bottom of said plug and a seal ring providing a seal between said annular section and said plug.

11. A valve assembly comprising body means having side inlet and outlet ports and an end by-pass port, hollow plug means rotatable in said body means and having side inlet and outlet openings adapted to align with said inlet and outlet ports in a valve open position and an end opening aligning with said by-pass port, and variable orifice valve means mounted in said body means by-pass port and responsive to the pressure of fluid in said body means and said plug means to regulate the fluid discharge from said body means.

12. A valve assembly as defined in claim 11, said outlet opening on said plug means being shaped to provide an opening of decreasing area in the valve opening direction assuring a gradual increase in flow through said outlet port as said plug means is rotated in a valve opening direction.

13. A valve assembly as defined in claim 12, said outlet opening including an enlarged flow portion and a narrow slot portion extending circumferentially around said plug means from said enlarged flow portion in the valve opening direction, whereby upon initial valve opening movement of said plug means fluid flow through said slot portion to said outlet port of said body means.

14. A valve assembly as defined in claim 13, wherein said plug means is rotated a predetermined angular distance between valve closed and valve fully open positions and said narrow slot portion extends circumferentially around said plug means an angular distance of up to about one-half said predetermined angular distance of rotation of said plug means.

15. A valve assembly as defined in claim 13, said inlet opening on said plug means comprising an enlarged generally rectangular flow portion and a narrow slot portion extending circumferentially around said plug means a short distance from said enlarged flow portion in the valve opening direction of said plug means to provide a smooth flow of fluid through said plug means during initial opening movement thereof.

16. A valve assembly as defined in claim 15, wherein said inlet and outlet openings are circumferentially spaced on said plug means so that said plug means is rotated through an angular distance of about 100° between valve closed and valve fully open positions.

17. A valve assembly as defined in claim 16, comprising a resilient seal ring providing a seal between said plug means and said outlet port of said body means, and spring means mounted between said body means and said seal ring to urge said seal ring into sealing engagement with said plug means.

18. A valve assembly as defined in claim 17, wherein said outlet port of said body means is defined by a saddle member which has an inner annular portion that tapers and converges inwardly of said body means towards said plug means, said resilient seal ring being mounted on said annular tapered portion and biased by said spring means into sealing engagement with said plug.

19. A valve assembly as defined in claim 13, comprising a resilient seal ring providing a seal between said plug means and said outlet port on said body means, and spring means mounted between said body means and said seal ring to urge said seal ring into sealing engagement with said plug means.

20. A valve assembly as defined in claim 11, comprising retainer means in said body means upstream of said bypass post providing bearing support for the bottom of said plug means.

21. A valve assembly as defined in claim 20, said retainer means comprising an annular section surrounding the bottom of said plug means and a seal ring providing a seal between said annular section and said plug means.

22. A valve assembly comprising substantially cylindrical body means having fluid inlet and outlet ports, a cylindrical valve member rotatable in said body means and having a through passage provided with inlet and outlet openings adapted to align with said fluid inlet and outlet ports in a valve open position, one of said fluid inlet and outlet ports being defined by a saddle member which has an inner annular portion that tapers and converges inwardly of said body means toward said valve member, a resilient seal ring mounted on said annular tapered portion and providing a seal between said valve member and said one port of said body means, and spring means mounted between said body means and said seal ring to urge said seal ring into sealing engagement with said valve member.

23. A valve assembly as defined in claim 22, said spring means comprising a spring plate element which is substantially flat in a relaxed preassembly condition and is deformable between said body means and said seal ring to urge said seal ring into sealing engagement with said valve member.

24. A valve assembly as defined in claim 23, wherein said spring plate element has parallel side edges bent inwardly toward said seal ring.

25. A valve assembly comprising body means having fluid inlet and outlet ports, hollow plug means rotatable in said body means having side inlet and outlet openings adapted to align with said inlet and outlet ports in a valve open position, said outlet opening including an enlarged flow portion with a sloping reduction in flow area to a narrow slot portion extending circumferentially around said plug means from said enlarged flow portion in a valve opening direction whereby upon initial valve opening movement of said plug means fluid flows through said slot portion to said outlet port and said inlet opening comprises an enlarged generally rectangular flow portion and a narrow slot portion extending circumferentially around said plug means a short distance from said enlarged flow portion in the valve opening direction to provide a smooth flow of fluid through said plug means during initial opening movement thereof.

26. A valve assembly as defined in claim 25, wherein said inlet and outlet openings are circumferentially spaced on said plug means so that said plug means is rotated through an angular distance of about 100° between valve closed and valve fully open positions.

27. A valve assembly as defined in claim 25, said plug means having an open end portion, and retainer means in said body means for providing bearing support for said plug means.

28. A valve assembly as defined in claim 27, said retainer means comprising an annular member separate from said body surrounding said bottom portion of said plug means and a seal ring providing a seal between said annular section and said plug means.

29. A valve assembly comprising body means having side inlet and outlet ports and a bottom bypass port, hollow plug means rotatable in said body means and having side inlet and outlet orifices adapted to align with said inlet and outlet ports in a valve open position and a bottom end opening aligning with said bypass port, said outlet orifice including an enlarged flow portion and a narrow slot portion extending circumferentially around said plug means from said enlarged flow portion in the valve opening direction whereby upon initial valve opening movement of said plug means fluid flows through said slot portion to said outlet port of said body means, and variable orifice valve means mounted in said body means adjacent said bypass port and responsive to fluid pressure in said plug means to discharge fluid therefrom, said variable orifice valve means including a normally closed helical spring valve member which is axially expansible to an open position in response to fluid pressure in said plug means.

30. A valve assembly as defined in claim 29, comprising a conduit section extending beyond said bypass opening and a stop member mounted in said conduit section for establishing the maximum valve open position of said spring.

31. A valve assembly as defined in claim 29, comprising retainer means in said body means upstream of said bypass orifice means for providing bearing support for the bottom of said plug means.

32. A valve assembly as defined in claim 31, said retainer means comprising an annular section surrounding the bottom of said plug means and a seal ring providing a seal between said annular section and said plug means.

33. A valve assembly as defined in claim 29, comprising a resilient seal ring providing a seal between said plug means and said outlet port of said body means, and spring means mounted between said body means and said seal ring to urge said seal ring into sealing engagement with said plug means.

34. A valve assembly as defined in claim 29, wherein said inlet and outlet orifices are circumferentially spaced on said plug means so that said plug means is rotated through an angular distance of about 100° between valve closed and valve fully open position.

35. A valve assembly as defined in claim 34, wherein said narrow slot portion of said outlet orifice extends circumferentially around said plug means an angular distance of up to about one-half the total angular displacement of said plug means between valve closed and valve fully opened positions.

36. A valve assembly as defined in claim 35, said inlet orifice on said plug means comprising an enlarged generally rectangular flow portion and a narrow slot portion extending circumferentially around said plug means a short distance from said enlarged flow portion in the valve opening direction of said plug means to provide a smooth flow of fluid through said plug means during initial opening movement thereof.

37. A hot water system for supplying an automotive heater core comprising: a water pump; a first conduit means leading from the water pump outlet to the heater core inlet; a second conduit means leading from the heater core outlet to the water pump inlet; and a control valve assembly comprising body means having a fluid inlet and a fluid outlet connected to control flow through said first conduit means and by-pass orifice means in fluid flow communication between said first and second conduit means; a hollow plug valve member rotatably supported in the interior of said body means and defining a through axial passage communicating at one end with said by-pass orifice means and having respective side inlet and outlet openings communicating with said through passage and adapted to align with said fluid inlet and fluid outlet in an open position of said hollow plug valve member; and valve means responsive to fluid pressure within the interior of said body means for controlling fluid flow through said by-pass orifice means.

38. The system of claim 37 wherein said control valve assembly includes said by-pass orifice means and said outlet opening of said hollow plug valve member is shaped to provide a gradual increase in flow through said outlet opening to said fluid outlet and said heater core inlet upon rotation of said hollow plug valve member in a valve opening direction.

39. The system of claim 38 wherein said inlet opening is shaped to provide a gradual increase in flow through said inlet opening to said outlet opening upon rotation of said hollow plug member in a valve opening direction to provide a smooth flow of fluid through said plug means to said outlet opening during at least the intial opening movement.

40. The system of claim 39 wherein said outlet opening and said inlet opening each comprise an enlarged flow portion and a narrow slot portion extending circumferentially around said plug valve member from said enlarged portion in the valve opening direction.

* * * * *

UNITED STATES PATENT OFFICE
CERTIFICATE OF CORRECTION

Patent No. 3,966,119              Dated    June 29, 1976

Inventor(s)    Robert M. Harter et al.

It is certified that error appears in the above-identified patent and that said Letters Patent are hereby corrected as shown below:

The term of this patent subsequent to

March 4, 1992, has been disclaimed.

Signed and Sealed this

Twenty-first Day of September 1976

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,966,119
DATED : June 29, 1976
INVENTOR(S) : Gary L. Russo et al

It is certified that error appears in the above-identified patent and that said Letters Patent are hereby corrected as shown below:

Column 3, line 23, change "temperture" to --temperature--.

Column 5, line 40, change "exerior" to --exterior--.

Column 5, line 54, change "spacign" to --spacing--.

Column 7, line 6, change "passes" to --passed--.

Column 9, line 22, (claim 13) change "flow" to --flows--.

Column 9, line 55, (claim 18) change "towards" to --toward--.

Column 9, line 67, (claim 20) change "post" to --port--.

Signed and Sealed this

Fourteenth Day of December 1976

[SEAL]

Attest:

RUTH C. MASON
Attesting Officer

C. MARSHALL DANN
Commissioner of Patents and Trademarks